United States Patent [19]

Pentith

[11] Patent Number: 4,609,099
[45] Date of Patent: Sep. 2, 1986

[54] BELT CONVEYOR ARRANGEMENT

[75] Inventor: Gerald R. O. Pentith, Sturgis, Ky.

[73] Assignee: Continental Conveyor and Equipment Company, Inc., Winfield, Ala.

[21] Appl. No.: 641,897

[22] PCT Filed: Feb. 16, 1984

[86] PCT No.: PCT/GB84/00042
§ 371 Date: Aug. 13, 1984
§ 102(e) Date: Aug. 13, 1984

[87] PCT Pub. No.: WO84/03271
PCT Pub. Date: Aug. 30, 1984

[30] Foreign Application Priority Data

Feb. 18, 1983 [GB] United Kingdom ............. 8304634
Dec. 8, 1983 [GB] United Kingdom ............. 8332830

[51] Int. Cl.⁴ ............................................. B65G 23/14
[52] U.S. Cl. ............................... 198/833; 198/839
[58] Field of Search ........................... 198/833, 839

[56] References Cited

U.S. PATENT DOCUMENTS

| 476,787 | 6/1892 | Dale | 198/839 X |
| 870,050 | 11/1907 | Robbins | 198/833 X |
| 2,582,881 | 1/1952 | Mitchell | 198/839 |
| 2,732,058 | 1/1956 | Nigra et al. | 198/839 |

FOREIGN PATENT DOCUMENTS 557659  5/1958  Canada ...................... 198/839

Primary Examiner—Joseph E. Valenza
Assistant Examiner—Jonathan D. Holmes
Attorney, Agent, or Firm—James H. Tilberry

[57]  ABSTRACT

A continuous belt (14) has upper and lower runs (23a, 23b) of continuous ropes (23) carried and driven by end rollers (12, 13) and intermediate wheels (22). To allow the lower run (14b) of the belt to be supported by the lower run (23b) of the ropes, the lower run of the belt is laterally diverted from below the lower run (23b) of the ropes and re-diverted back onto the lower run of the ropes by rollers (30) in the region of one end roller (12). The lower run of the belt is again diverted laterally and re-diverted below the lower run (23b) of the ropes adjacent the other end roller (13). In another embodiment, the belt (114) is twisted while the lower run of the ropes (123) is vertically diverted to allow space for the twisting of the lower run of the belt below the upper run of the belt, so that lateral movement of the belt beyond the normal confines of the conveyor arrangement is avoided.

6 Claims, 4 Drawing Figures

BELT CONVEYOR ARRANGEMENT

This invention relates to belt conveyor arrangements, for example, for transporting bulk materials over long distances, as for example in transporting coal in a mine.

Such conveyor belts are often laterally steel reinforced and supported at opposite edges by ropes or cables. Such conveyors are expensive and it has been known for the reinforcement to break and collapse between the supporting ropes. Belts composed of steel cord are also used, but these are highly expensive and can be punctured by sharp material. They have been known to split longitudinally.

It is also known, for example, from British Pat. No. 1,591,461, published June 24, 1981, to provide an arrangement in which the belt has longitudinal formations at opposite faces near the edges of the belt, for supporting the belt on continuous ropes or cables. The formations on one face engage the upper run of the ropes and the formations on the other face engage the lower run of the ropes. The ropes follow a tortuous path and are consequently subjected to damaging forces and the face of the belt, which carries bulk material, carries formations which are liable to damage.

The present invention is concerned with providing a belt conveyor arrangement which uses a standard conveyor belting which is cheaper and more reliable.

The present invention provides a belt conveyor arrangement comprising an elongate frame having a roller at each end and a continuous belt passing around the rollers, at least one of the rollers being driven, a multiplicity of rotatable members carried at spaced intervals along the frame and including upper members to support an upper run of the belt and lower members to support a lower run of the belt, a plurality of laterally spaced continuous ropes running around the members, the belt being supported by the ropes, and first means for diverting the path of the lower run of the belt with twisting of the belt as it leaves one of the rollers and for leading the belt back onto the ropes, so that the bottom run is supported on the ropes, and second means for diverting said path again with twisting of the belt and returning the belt below the lower runs of the ropes before the belt reaches the other roller.

In one embodiment, each of the first and second means diverts the path of the lower run of the belt laterally beyond said members and ropes, whilst twisting the belt, before returning the belt back onto the ropes, or back below the lower runs of the ropes, respectively.

In another embodiment, third and fourth means are provided for diverting the paths of the ropes upwardly and downwardly beneath the upper run of the belt to provide space for twisting of the belt beneath said upper run of the belt. This embodiment is preferred, since broadening of the conveyor arrangement near each end is avoided and the whole arrangement is maintained within the confines of the upper run of the belt.

It is preferred that the rotatable members are arranged in transverse rows, each row including more than two members, the members of each row engaging respective ropes.

The belt may comprise longitudinally extending reinforcement and guide strips on one face of the belt, the strips engaging the ropes, and advantageously the strips are shaped to conform to the shape of the ropes.

Magnetic means may be provided to establish attraction forces between the belt and the rotatable members or the ropes to inhibit lateral displacement of the belt.

Reference is now made to the accompanying drawings, wherein.

Figure 1:
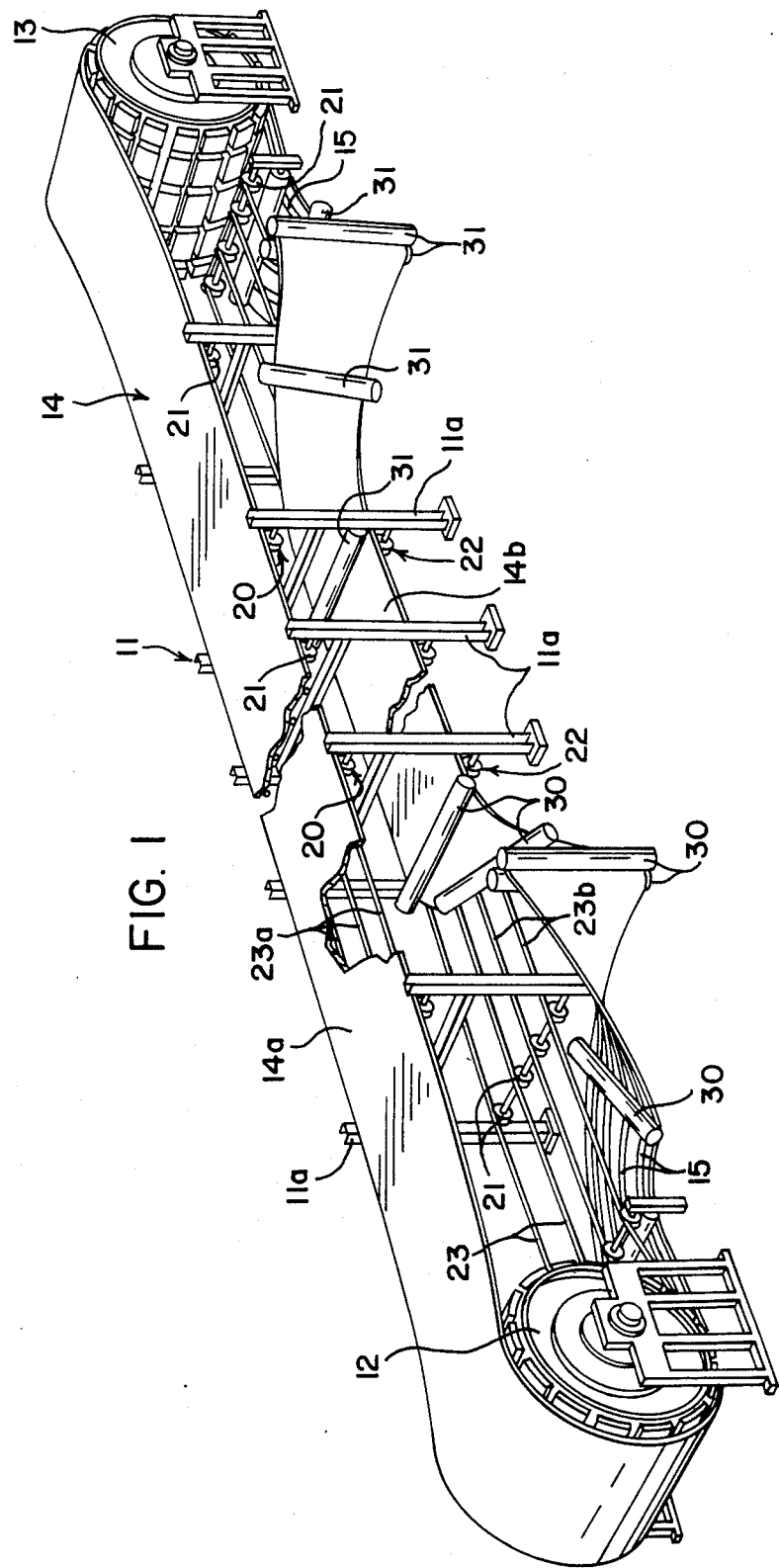
FIG. 1 is a diagrammatic perspective view of a first embodiment of a conveyor arrangement according to the invention.
Figure 2:
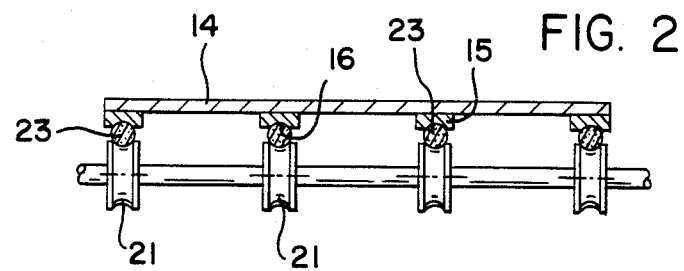
FIG. 2 is a detail view of the arrangement.

Arrangement of FIGS. 1 and 2 comprises an elongate frame 11, only the uprights 11a of which are illustrated for clarity. The uprights are interconnected by horizontal members, cross-pieces and diagonal braces (not shown) in conventional manner, e.g. as disclosed in British Pat. No. A-1,591,461. At each end of the frame is mounted a roller or pulley 12, 13, at least one of which is driven, and a continuous woven belt 14 passes over the rollers. The rollers 12, 13 and the drive means therefor, may also be conventional.

Between the rollers at spaced intervals, the frame is provided with upper rows 20 of wheels 21 and lower rows 22 of such wheels. The wheels are freely rotatable. Each row 20, 22, which extends laterally of the frame, comprises a plurality of spaced wheels 21. Each wheel has a peripheral channel for receiving and guiding a rope or cable 23.

A plurality of continuous steel ropes or cables 23 are provided for supporting the belt 14. Each rope corresponds to one of the wheels 21 in each row 20, 22, and has an upper run 23a supported on the wheels 21 of the upper rows 20 and a lower run 23b supported on the wheels 21 of the lower rows 22.

The belt 14 is provided with longitudinally extending strips, 15, which reinforce the belt. Each strip has a concave recess 16 conforming the strip to the shape of a rope 23, and each strip engages a corresponding rope to locate and guide the belt. Each strip may be composed of hard rubber or plastics material secured to the belt.

As the lower run of the belt 14 leaves the roller 12, it is diverted laterally by rollers 30 from its normal path to one side of the upper run of the belt and then inverted and rediverted back to its normal path, but inverted with the strips 15 engaged on top of the lower run of the ropes 23. Before the belt reaches the other roller 13, rollers 31 again laterally divert and re-invert the belt 14 and then return it to a position below the ropes 23. The long lower run of 'the belt is, therefore supported throughout its run on the ropes, except where the diversion and twisting is effected.

This arrangement permits use of cheap material for construction of the belt, which will be strong in use, due to the substantial support provided by the ropes. No lateral reinforcement of the belt is required. Further there is no twisting of the ropes, so that the ropes last much longer. The strips 15 are provided on only one face of the belt and do not cause any obstruction, nor are they exposed to likely damage.

Figure 3:
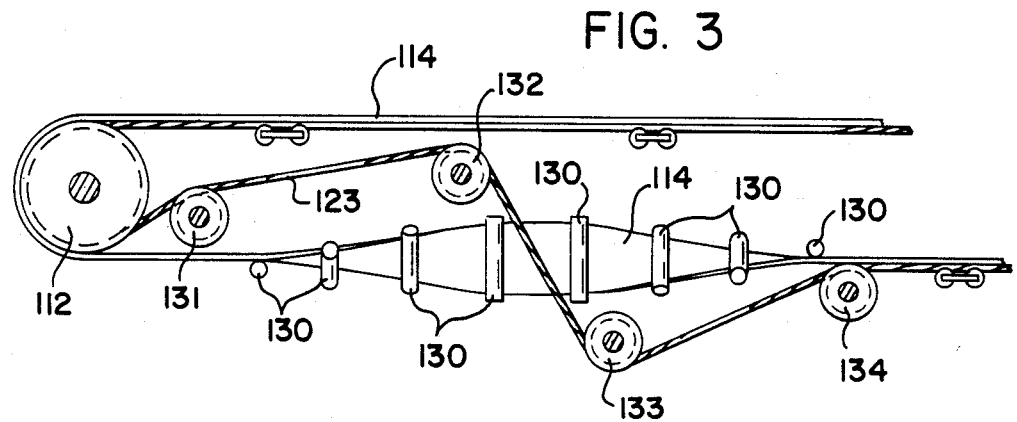
FIG. 3 is a side elevation of a part of the second embodiment of a conveyor arrangement according to the invention.
Figure 4:
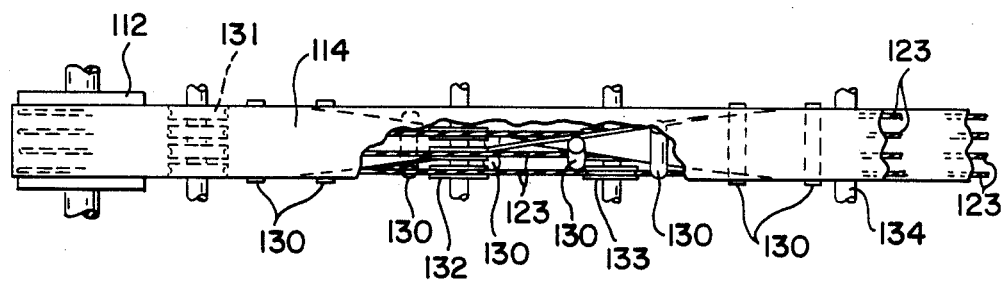
FIG. 4 is a plan view of the second embodiment.

The embodiment of FIGS. 3 and 4 is similar to that of FIGS. 1 and 2, but the belt is not diverted laterally of the upper run of the belt. The path of the belt is diverted angularly through 180° as in the first embodiment, but the path remains beneath the upper run of the belt 114 within the normal width of the conveyor arrangement.

The lower run of the belt is twisted adjacent one main roller 112 by means of deflecting rollers 130. To permit such twisting within the confines of the upper run of the belt, deflecting wheels 131, 132 are provided to lift the ropes 123 above the twisting belt, without twisting the ropes. Further wheels 133,134 deflect the rope back below the lower run of the belt where the latter is twisted substantially 90° from its normal path, and return the ropes to their normal path substantially where the belt regains its normal path.

A similar assembly is provided near the other main roller (not shown) at the opposite end of the conveyor arrangement, for deflecting the belt back below the lower run of the ropes.

This arrangement has all the advantages of the first embodiment with the additional advantage that the arrangement near each end of the conveyor is very compact.

I claim:

1. A belt conveyor arrangement comprising an elongate frame, a roller journaled at each end of said frame, at least one of said rollers being driven, an endless belt passing around said rollers and having an upper and lower run, a plurality of rotatable members carried at spaced intervals along the frame and including upper members and lower members spaced along said upper and lower runs of said belt, a plurality of laterally spaced continuous cables running around said rollers and engaging said rotatable members for support thereby, said belt being supported directly by upper and lower runs of said cables, first inverting means for inverting the path of said lower run of said belt as it leaves one of the rollers and for leading said belt onto the lower run of said cables, first guide rolls mounted between said first inverting means and said one roller for diverting said cables upwardly from said lower run of said belt toward said upper run of said belt, said first inverting means located directly beneath said upper run of said belt and operative in said inverting process to maintain a portion of said belt in a vertical plane, and second guide rolls mounted on said frame along the path of said first inverting means for guiding said plural cables downward past said vertical plane of said belt to a horizontal plane that is beneath said lower run of said belt to support said belt in said lower run and second inverting means for inverting the path of said lower run of said belt from said cables and returning said belt below the lower run of the cables before the belt reaches said other roller.

2. A belt conveyor as set forth in claim 1 wherein said belt has an outer face and an inner face, said inner face has a plurality of longitudinal extending guide strips, said strips being recessed to receive said cables.

3. A belt conveyor as set forth in claim 2 wherein said first inverting means invert said belt laterally outwardly away from said cables and lead said belt back into line with said cables for support thereby.

4. A conveyor apparatus comprising a rotatable drive pulley, a tail pulley rotatably mounted in spaced relation to said drive pulley, an endless flat conveyor belt trained about said pulleys to provide a load-carrying upper conveying run and a return run extending between said pulleys, said conveyor belt supported by said pulleys for longitudinal movement around said pulleys, said conveyor belt having an upper face in said conveying run and a lower surface in said conveying run, first means adjacent said tail pulley contacting said return run for inverting said return run to locate said upper face in a top position for said return run, second means adjacent said drive pulley for inverting said return run to locate said upper face in a bottom position adjacent said drive pulley, a plurality of laterally spaced cables extending in parallel relationship being trained about said pulleys, said belt having its upper run supported by all of said laterally spaced cables, said belt being diverted by said inverting means to position said return run of said belt is a horizontal plane wherein said belt is supported by all of said laterally spaced cables between said inversions of said belt between said tail pulley and said drive pulley, and guide means located adjacent each of said pulleys for deflecting said laterally spaced cables away from the longitudinal centerline of said return run, said first and second inverting means operative during inversion of said belt to maintain a portion of said return run in a vertical plane, and said guide means operative to guide at least a pair of said laterally spaced cables past either side of said belt while in said vertical plane to thereby position said cables below said belt as said belt is inverted for said return run and to reposition said cables above said belt at the end of said return run.

5. A conveyor apparatus as set forth in claim 4 wherein said lower surface of said belt has a plurality of longitudinally extending guide members that are operative to engage said cables for guiding said belt in a linear direction.

6. A conveyor apparatus as set forth in claim 5 wherein said guide members are arcuately recessed to receive said cables to facilitate the linear movement of said belt.

* * * * *